United States Patent [19]
Postadan et al.

[11] Patent Number: 6,095,734
[45] Date of Patent: Aug. 1, 2000

[54] PUSHNUT

[75] Inventors: Reynaldo M. Postadan, Roselle Park; John E. Baldowski, Green Brook, both of N.J.; Dave Ballantyne, Bloomfield Hills, Mich.

[73] Assignee: Transtechnology Corp., Liberty Corners, N.J.

[21] Appl. No.: 09/400,225

[22] Filed: Sep. 21, 1999

[51] Int. Cl.[7] .............................. F16B 13/07; F16B 19/00
[52] U.S. Cl. .......................... 411/182; 411/173; 411/913
[58] Field of Search ................................. 411/112, 173, 411/174, 175, 182, 508, 913

[56] References Cited

U.S. PATENT DOCUMENTS

| | | |
|---|---|---|
| 4,207,938 | 6/1980 | Mortus . |
| 4,300,865 | 11/1981 | Murray . |
| 4,595,325 | 6/1986 | Moran et al. . |
| 4,610,588 | 9/1986 | Van Buren, Jr. et al. ............... 411/173 |
| 4,749,320 | 6/1988 | Gutt . |
| 4,925,351 | 5/1990 | Fisher . |
| 5,316,422 | 5/1994 | Coffman . |
| 5,350,264 | 9/1994 | Stencel . |
| 5,662,443 | 9/1997 | Dziaba . |
| 5,829,934 | 11/1998 | Danby et al. ............................ 411/182 |
| 5,873,690 | 2/1999 | Danby et al. ....................... 411/182 X |
| 5,919,019 | 7/1999 | Fischer .................................... 411/182 |

*Primary Examiner*—Neill Wilson
*Attorney, Agent, or Firm*—Wall Marjama Bilinski & Burr

[57] ABSTRACT

A pushnut fastener having a substantially planar base portion from which a cylindrical sleeve is drawn and internally threaded. A pair of angled leg portions extending from opposing lateral edges of the base portion, each including a laterally extending tab partially extending into a space formed between said leg portions for engaging threads of a mating male fastener. The leg portions are preferably defined by inner and outer leg sections, each outer leg section including an inwardly angled section which engages the edges of a mounting hole of a panel into which the pushnut is seated during assembly.

13 Claims, 3 Drawing Sheets

PUSHNUT

FIELD OF THE INVENTION

The present invention relates to the field of fasteners and more particularly to an improved multi-threaded insert-type panel fastener used for joining two or more panels or a component and a panel together.

BACKGROUND OF THE INVENTION

A number of fasteners are known in which blind fastening occurs, particularly in the automotive industry as found in the assembly of instrument panels, bumpers, and the like. Such assemblies are typically carried out either by hand, or through use of automated equipment, with the above assembly process typically involving the interconnection of a pair of panel-like sections having edges which are placed in abutting or adjoining contact with one another. A pushnut or other fastener interconnecting the panels is used to complete the assembly.

Certain concerns have been voiced with regard to the inadequacy of the assembly process as well as ergonomic issues in relation to current fasteners. First, known pushnut fasteners present difficulties during installation. That is, the fastener is not easily fitted into a panel hole. Second, known fasteners have been prone to stripping problems during assembly, requiring expensive rework costs and perhaps more critically, creating assembly down time.

Third, known insert type fasteners such as those described in U.S. Pat. Nos. 4,925,351, 4,300,865; and 4,595,325 cannot create a sufficient clamp force due to a single threaded design. As a result, an inserted threaded male fastener can become loose during service due to shock and vibration.

SUMMARY OF THE INVENTION

A primary object of the invention is to improve the state of the art of panel fasteners.

Another primary object of the invention is to provide a pushnut type of fastener which inhibits the loosening of a mating threaded male member.

It is yet another primary object of the present invention to provide a panel fastener which is easier to install during assembly than known fasteners and is more "operator friendly".

Yet another object of the present invention is to offer a fastener which is able to provide and withstand higher torque values than existing insert type single threaded pushnuts.

Still another object of the invention is to manufacture an insert type fastener which can provide tolerance for dimensional variations in mounting panel material thickness.

Therefore and according to a preferred aspect of the invention, there is provided a pushnut fastener comprising a body member including a substantially planar base portion from which a cylindrical sleeve is drawn perpendicular from the base portion and internally threaded for receiving a threaded male fastener. A pair of angled leg-like portions extends from opposing sides of the base portion. According to the invention, a spacing defined between the two leg portions is sized for accommodating the shank of the threaded fastener, each of the angled leg portions having a tab-like section that projects inwardly into the defined opening for engaging with the threads of the male fastener.

Preferably, the tab-like sections of the pushnut provide an anti-collapsing feature which converges onto the threads of the mating fastener. This feature improves the fastener's capability to remain in the panel hole during assembly. Once the fastener is assembled in the panel and the threaded fastener has engaged the anti-collapse feature, there is added support provided to prevent stripping of the pushnut from the panel. The above feature further prevents the leg portions of the pushnut from collapsing onto the remainder of the body portion while the part is in various loading conditions.

Another feature of the presently described pushnut is controlled resistance and friction which renders the male fastener and insert panel fastener immovable during dynamic loading and/or vibration. An advantage realized by this feature is that undesired rotation of the male fastener is minimized.

The presently described fastener also preferably includes an anti-rattle feature provided by inwardly angled sections of the leg portions, each of which assist in maintaining contact with the panel into which the pushnut is installed during assembly.

Another feature of the presently described fastener is lock-in capability. That is, the space between the ends of the leg portions is sufficient to enable engagement with the male fastener, providing a lock-in feature by extending the leg portions of the pushnut outwardly away from each other and upwardly relative to the base portion.

Yet another important feature of the presently described fastener is provided by the lead-in configuration of the cylindrical barrel and design of the threads which prevents cross-threading. This feature provides tolerance for assembling the male fastener at various angles without stripping failures and further enables blind installation in places which are difficult to access.

The pushnut fastener can also be used with certain male threaded fasteners which can engage the top based surface in the vicinity of the extruded hole to provide metal to metal joining while at the same time allowing a plastic or other component made from a soft resilient material to be secured without over-compression.

These and other objects, features, and advantages will become apparent from the following Detailed Description which should be read in conjunction with the accompanying drawings.

DETAILED DESCRIPTION

The following discussion relates to a pushnut fastener in accordance with certain preferred embodiments of the present invention. Throughout the course of discussion, certain descriptive terms are used, such as "top", "bottom", "upper", "lower", "inner", "outer", "lateral" and the like. These terms are used solely to provide a frame of reference relative to the accompanying drawings and are not intended to be limiting of the inventive concepts described herein.

Figure 1:
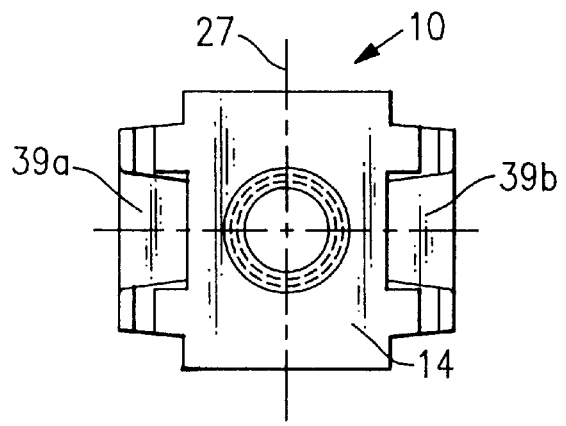
FIG. 1 is a top view of a pushnut fastener manufactured in accordance with a preferred embodiment of the present invention.
Figure 2:
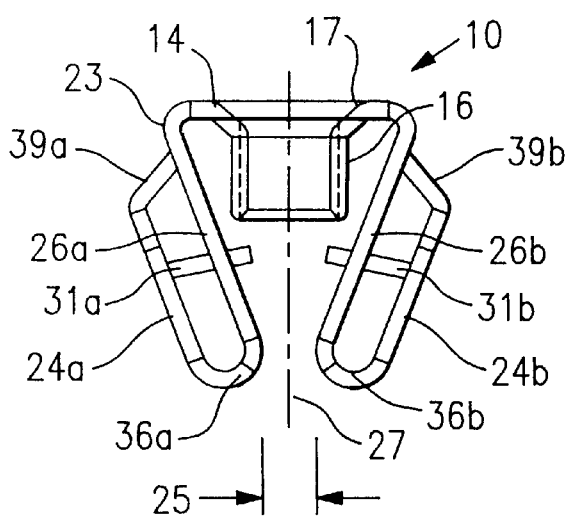
FIG. 2 is a front view of the pushnut fastener of FIG. 1.
Figure 3:
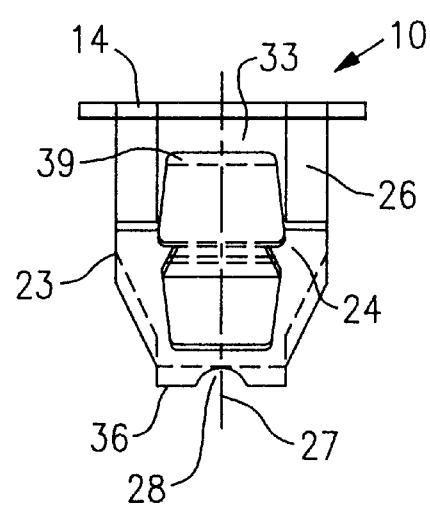
FIG. 3 is a side view of the pushnut fastener of FIGS. 1 and 2, as rotated 90 degrees from the pushnut of FIG. 2.

Referring to FIGS. 1–3, a pushnut fastener 10 made in accordance with a first embodiment is preferably fabricated by stamping from a metal sheet material, such as SAE 1050 spring steel. According to the present embodiment, the thickness of the material is approximately 0.63+0.05 mm, though this parameter can easily be varied depending on the application.

More specifically, the pushnut fastener 10 includes a substantially planar base portion 14 having a cylindrical barrel portion 16. The cylindrical barrel portion 16 is internally threaded to accept a male mating fastener 22 and includes a lead-in portion 17. The lead-in portion 17 assists in aligning the male threaded fastener 22, FIGS. 4, 5, and therefore prevents cross-threading.

Figure 4:
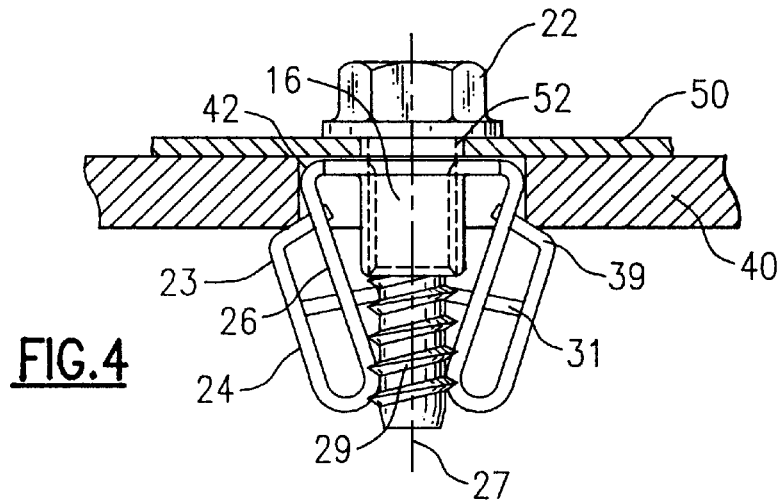
FIG. 4 is a front view of the pushnut fastener of FIGS. 1–3, as part of a plastic panel assembly.
Figure 5:
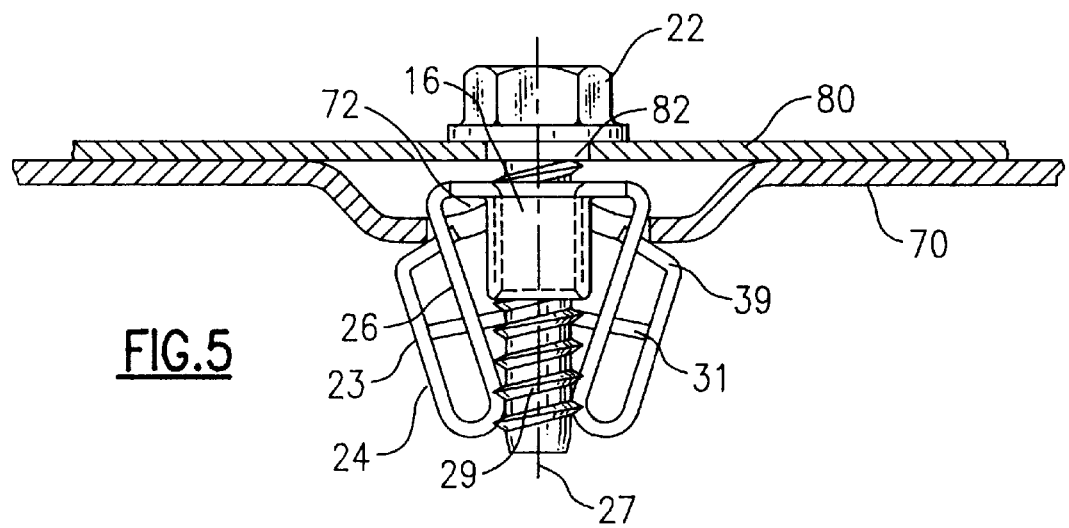
FIG. 5 is a side view of the pushnut fastener of FIGS. 1–3, as part of a steel panel assembly.

The pushnut fastener 10 of the present invention further includes a pair of angled leg portions 23 that extend from opposing lateral sides of the base portion 14 and define a spacing 25 through which the male threaded fastener 22, FIGS. 4, 5, passes. According to the present embodiment, each of the leg portions 23 are commonly angled approximately 20–30 degrees from vertical; that is, with respect to a vertical axis 27 extending through the hollow interior of the cylindrical barrel portion 16. Each angled leg portion 23 is defined by an inner leg section 26a, 26b extending directly from the base section 14 which is retroflexed into a coinciding and substantially parallel outer leg section 24a, 24b. An intermediate tab 31a, 31b of each of the outer leg portions 24a, 24b projects through an aligned opening 33 provided in each inner leg section 26a, 26b. The projecting tabs 31a, 31b each project inwardly at an angle relative to a horizontal plane defined by the base portion 14 and are sized for engaging the threaded shank 29, FIGS. 4,5 of the male fastener 22, FIGS. 4, 5. The majority of the length of each outer leg section 24a, 24b extends in parallel with a corresponding inner leg section 26a, 26b, with the exception of the retroflexed top bend 36a, 36b and a lower inwardly depending section 39a, 39b which terminates inside the aligned opening 33.

The inwardly depending sections 39a, 39b each extend inwardly toward a corresponding inner leg portion 26a, 26b at approximately a 45 degree angle with the inner leg portion. Each of the inwardly depending sections 39a, 39b are spaced away from the planar base portion 14.

Referring now to FIG. 4, a typical assembly procedure for plastic panels is herein described using the pushnut fastener 10. The assembly procedure involves the mating of a pair of panels 40, 50. The first panel 40 is made from a plastic material having an opening 42 which accommodates the planar base portion 14 of the pushnut fastener 10. The second panel 50, also made from a plastic or other suitable material, includes a pilot hole 52 which is aligned with the center through opening of the base portion 14 and is sized for receiving the threaded shank 29 of a male fastener 22.

As the male fastener 22 is assembled, the angled leg portions 26a, 26b are caused to bow outwardly away from the vertical axis 27 in that the defined spacing 25 at the bottom of the fastener 10 is preferably smaller that of the major diameter of the fastener 22. In the meantime, and as a result, the inwardly depending sections 39a, 39b are each pushed into contact with the edges of the opening 42. In addition, the projecting tabs 31a, 31b engage the threaded shank 29 of the fastener 22, but do not prevent assembly thereof.

When completed, the projecting tabs 31a, 31b prevent the pushnut fastener 10 from collapsing but do not prevent assembly of the male fastener 22. In the meantime, the inwardly depending sections 39a, 39b provide an anti-rattle feature during service including assemblies in which a threaded fastener is not required, i.e., those assemblies involving the pushnut fastener and the engaged panel. In this manner, both stripping and collapse of the pushnut fastener 10 are effectively minimized.

Figure 7:
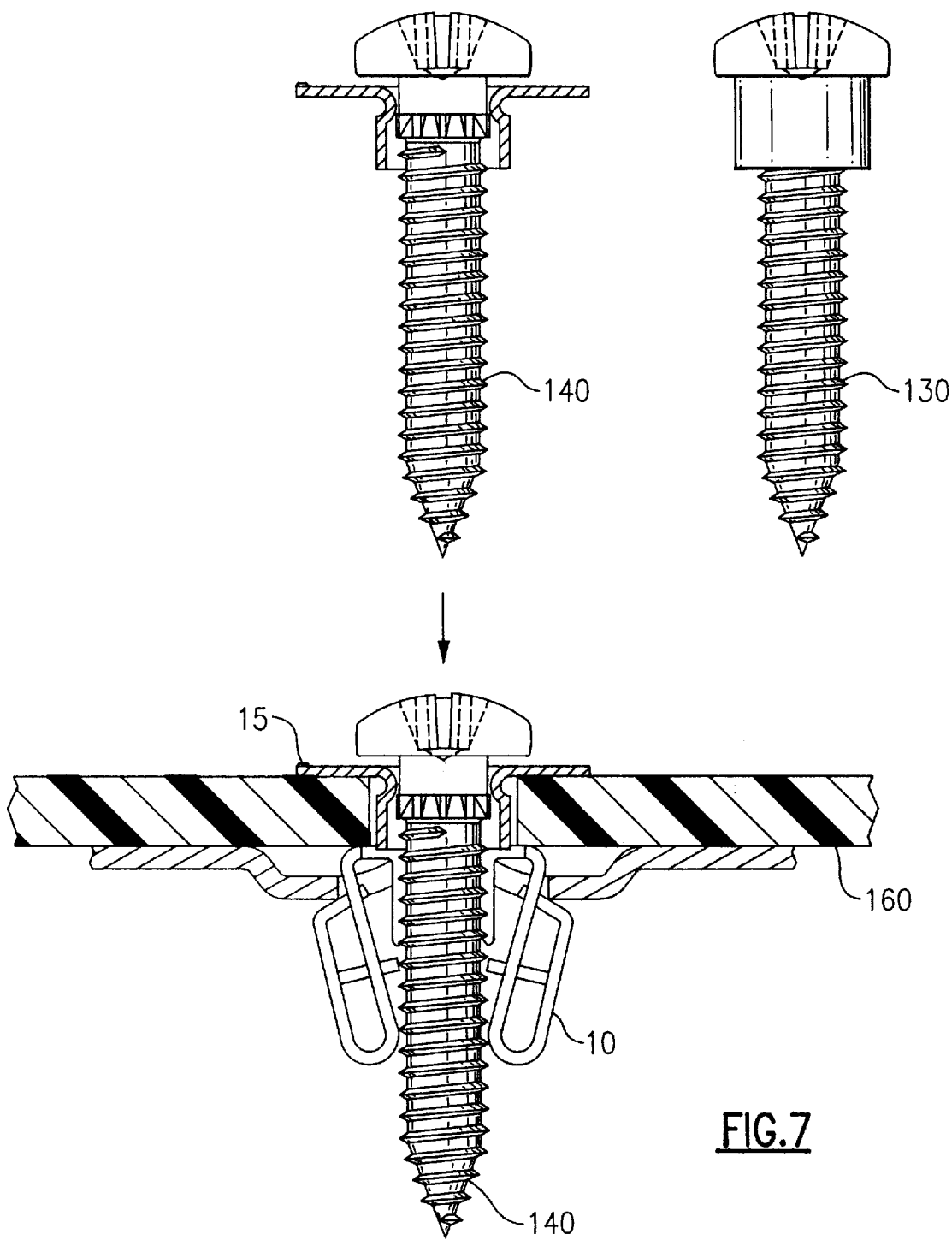
FIG. 7 is a sectional view of a pushnut used with a specific type of threaded fastener in a panel assembly.

Referring to FIG. 7, the flat top surface 15 of the planar portion 14 of a pushnut fastener as described by the present invention provides an accurate mounting surface for certain male threaded fasteners, such as shoulder screws 130, shown in phantom, and the fastener 140 shown in FIG. 7, that clamp directly to this surface while simultaneously securing a panel component to the nut holding member. This assembly provides a tight metal to metal clamping action between the pushnut fastener and the fastener at the same time a controlled non-damaging clamp load is applied to the component being secured such as a plastic panel component 160. The metal to metal clamping action prevents loosening over time.

Other panel assemblies can utilize the above-described pushnut fastener. For example, and referring to FIG. 5, a steel panel 70 having a recessed opening 72 can accommodate the above pushnut fastener 10, still being able to engage with the edges of the mounting opening 72 as used in interconnecting a second panel 80 having a through opening 82 for accommodating the male fastener 22 in the manner previously described.

Figure 6:
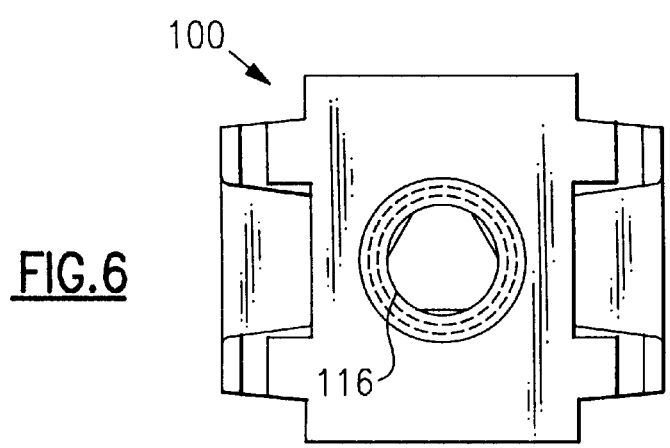
FIG. 6 is a top view of a pushnut fastener made in accordance with a second preferred embodiment including a prevailing torque feature.

Preferably, the pushnut fastener 10 can include two other optional features. First, and referring to FIG. 6, a pushnut 100 can include distorted cylindrical barrel portion 116 in order to avoid loosening of a male threaded fastener (not shown in this FIG.) and a prevailing torque feature. Second, a hole 28, FIG. 3, can be provided at the bottom end of each leg portion 23, the hole being designed for easier manufacturing of the pushnut fastener 10.

PARTS LIST FOR FIGS. 1–7

10 multi-thread pushnut fastener
14 planar base portion
16 threaded barrel portion
17 lead-in portion
22 threaded male fastener
23 leg sections
24a outer leg portion
24b outer leg portion
25 spacing
26a inner leg portion
26b inner leg portion
27 vertical axis
28a hole
28b hole
31a intermediate tab
31b intermediate tab
33 opening
36a retroflexed top bend
36b retroflexed top bend
39a inwardly depending portion
39b inwardly depending portion
40 panel 42 panel opening
50 panel
52 panel opening
70 panel
72 panel opening
80 panel
82 mounting opening
100 pushnut fastener
116 distorted cylindrical barrel portion
120 fastener
130 shoulder screw
140 fastener, male
160 panel component (plastic)

Though the preceding has been described in terms of certain preferred embodiments, it will be readily apparent that certain modifications and variations are possible which would be contemplated as within the scope of the invention according to the following claims.

We claim:

1. A pushnut insert-type fastener comprising:

a substantially planar base portion;

a cylindrical sleeve drawn generally perpendicular from said base portion, said sleeve including an internally threaded portion sized for receiving a male mating fastener; and a pair of angled leg portions extending from opposing lateral edges of said base portion, each angled leg portion having an inner leg member and an outer leg member, each said outer leg member including an intermediate laterally projecting tab extending through a window of said inner leg member extending into a space formed between said leg portions for preventing collapse of said pushnut during assembly.

2. A pushnut fastener as recited in claim 1, wherein each of said outer leg members terminates in an inwardly angled end which engages the edge of a mounting hole of a panel into which said pushnut fastener is seated during assembly thereof.

3. A pushnut fastener as recited in claim 2, wherein said inwardly angled ends provide accommodations for dimensional variations in mounting panel thickness and prevents rattling of the pushnut fastener.

4. A pushnut fastener as recited in claim 1, wherein said cylindrical sleeve is a drawn barrel portion having said internally threaded portion.

5. A pushnut fastener comprising:

a substantially planar base portion;

a cylindrical sleeve drawn generally perpendicular from said base portion, said sleeve including an internally threaded barrel portion sized for receiving a male mating fastener; and a pair of angled leg portions extending from opposing lateral edges of said base portion, each angled leg portion having a laterally projecting tab partially extending into a space formed between said leg portions for preventing collapse of said pushnut fastener during assembly, wherein said internally threaded barrel section provides means for anti-crossthreading.

6. A pushnut fastener as recited in claim 1, wherein a through opening of said cylindrical sleeve has a lead-in feature to assist proper assembly.

7. A pushnut fastener as recited in claim 1, wherein each of said angled leg portions extend a greater distance from said planar base portion than said drawn cylindrical sleeve, and in which the leg portions extend inwardly toward said drawn cylindrical sleeve, such that the space between said angled leg portions is smaller between the ends of the leg portions than at the base portion to provide a self-aligning feature.

8. A pushnut fastener as recited in claim 7, wherein the space between the ends of the leg portions is sufficient to enable engagement with the male fastener and wherein the extending leg portions of the pushnut fastener extend outwardly away from one another and upwardly toward the base portion so as to provide a lock-in feature.

9. A pushnut fastener as recited in claim 1, wherein each of said angled leg portions extend approximately twice as far from said base portion as said drawn cylindrical sleeve.

10. A pushnut fastener as recited in claim 1, wherein said tabs are spaced apart from one another a sufficient distance so as to enable the male threaded fastener to engage said tabs, thereby providing lock-in of said fastener and preventing collapse of said pushnut.

11. A pushnut fastener as recited in claim 1, wherein said cylindrical sleeve is distorted to provide a prevailing torque feature to said fastener.

12. A pushnut fastener as recited in claim 1, wherein said planar base portion includes a substantially flat mounting surface for the shoulder portion of a shoulder screw.

13. A pushnut fastener as recited in claim 1 wherein said planar base portion includes a substantially flat exterior mounting surface.

* * * * *